United States Patent
Takahashi et al.

(10) Patent No.: US 11,541,853 B2
(45) Date of Patent: Jan. 3, 2023

(54) VEHICLE BRAKING CONTROL DEVICE

(71) Applicant: ADVICS CO., LTD., Kariya (JP)

(72) Inventors: Kenichiro Takahashi, Kariya (JP);
Kosuke Hashimoto, Kariya (JP);
Hayato Kubota, Kariya (JP); Daisuke Nakata, Toyota (JP)

(73) Assignee: ADVICS CO., LTD., Kariya (JP)

( * ) Notice: Subject to any disclaimer, the term of this patent is extended or adjusted under 35 U.S.C. 154(b) by 659 days.

(21) Appl. No.: 16/496,615

(22) PCT Filed: Mar. 29, 2018

(86) PCT No.: PCT/JP2018/013385
§ 371 (c)(1),
(2) Date: Sep. 23, 2019

(87) PCT Pub. No.: WO2018/186284
PCT Pub. Date: Oct. 11, 2018

(65) Prior Publication Data
US 2020/0017082 A1    Jan. 16, 2020

(30) Foreign Application Priority Data
Apr. 5, 2017    (JP) .............................. JP2017-075137

(51) Int. Cl.
*B60T 8/17*     (2006.01)
*B60L 7/26*     (2006.01)
(Continued)

(52) U.S. Cl.
CPC ................ *B60T 8/17* (2013.01); *B60L 7/26* (2013.01); *B60T 8/172* (2013.01); *B60T 8/321* (2013.01);
(Continued)

(58) Field of Classification Search
CPC .......... B60T 8/17; B60T 8/321; B60T 13/586; B60T 8/172; B60T 2270/604;
(Continued)

(56) References Cited

U.S. PATENT DOCUMENTS 4,658,939 A    4/1987   Kircher et al.
9,056,598 B2 *   6/2015   Bieltz .................. B60T 13/741
(Continued)

FOREIGN PATENT DOCUMENTS

JP     60-206766 A     10/1985
JP     2001-278020 A    10/2001
(Continued)

OTHER PUBLICATIONS

International Search Report dated Jun. 5, 2018 in PCT/JP2018/013385 filed on Mar. 29, 2018.

*Primary Examiner* — Pamela Rodriguez
(74) *Attorney, Agent, or Firm* — Oblon, McClelland, Maier & Neustadt, L.L.P.

(57) ABSTRACT

Provided is a vehicle braking control device applicable to a vehicle equipped with an electric-powered parking braking device, a hydraulic braking device and a regenerative braking device. The braking control device comprises a first braking control unit and a second braking control unit. When a parking braking operation is performed while the vehicle is travelling, the first braking control unit implements a first braking process which increases the braking force to the vehicle by operating the hydraulic braking device. When the braking force to the vehicle needs to be increased in a situation where the first braking process is being implemented, the second braking control unit implements a second braking process which increases the braking force to the vehicle by operating the regenerative braking device.

6 Claims, 4 Drawing Sheets

(51) Int. Cl.
  *B60T 8/172* (2006.01)
  *B60T 8/32* (2006.01)
  *B60T 13/58* (2006.01)
  *B60T 13/74* (2006.01)
(52) U.S. Cl.
  CPC .......... *B60T 13/586* (2013.01); *B60T 13/741* (2013.01); *B60T 2250/04* (2013.01); *B60T 2270/604* (2013.01); *B60T 2270/608* (2013.01)
(58) Field of Classification Search
  CPC .......... B60T 2250/04; B60T 2270/608; B60T 13/741; B60L 7/26
  See application file for complete search history.

(56) References Cited

U.S. PATENT DOCUMENTS

| | | |
|---|---|---|
| 2013/0138316 A1 | 5/2013 | Koyama |
| 2020/0238964 A1* | 7/2020 | Kubota ............... B60W 10/188 |

FOREIGN PATENT DOCUMENTS

| | | |
|---|---|---|
| JP | 2009-166656 A | 7/2009 |
| JP | 2013-112017 A | 6/2013 |

* cited by examiner

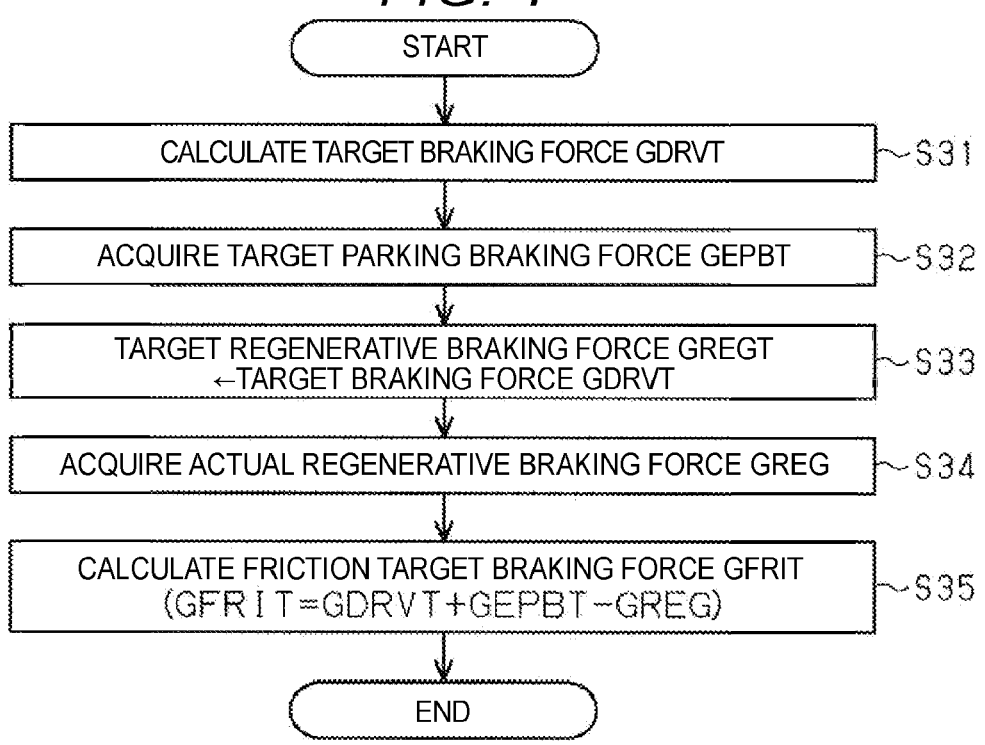
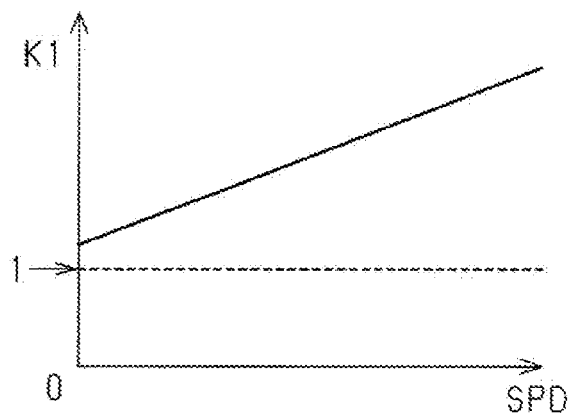

OPERATING AMOUNT BPA

PARKING BRAKING SWITCH
ON
OFF

BRAKING FORCE

VEHICLE BRAKING CONTROL DEVICE

TECHNICAL FIELD

The present invention relates to a vehicle braking control device.

BACKGROUND ART

As a parking braking device, known is an electric-powered parking braking device that applies a braking force corresponding to a drive amount of an electric motor to rear wheels when a driver performs a parking braking operation.

PTL 1 discloses an example of the braking control device that operates a hydraulic braking device to increase a braking force to respective front wheels and rear wheels without operating the parking braking device when the parking braking operation is performed while a vehicle is traveling.

CITATION LIST

Patent Literature

PTL 1: JP-A-2013-112017

SUMMARY OF INVENTION

Technical Problem

While the vehicle is traveling, even when the hydraulic braking device is operated due to the parking braking operation, an actual braking force may not reach a request braking force that is requested by the driver, as the braking force to the vehicle. In this case, even after the parking braking operation is performed, an operating amount of a braking operation member such as a brake pedal may be increased by the driver.

PTL 1 does not disclose control in a case where the driver requests an increase in the braking force to the vehicle after the parking braking operation is performed while the vehicle is traveling. That is, regarding the braking control device disclosed in PTL 1, there is room for improvement on braking control while the vehicle is traveling.

Solution to Problem

A vehicle braking control device for solving the above problem is a device applicable to a vehicle equipped with a plurality of braking devices including an electric-powered parking braking device that increases a braking force to a wheel of the vehicle when a parking braking operation is performed. The braking control device includes a first braking control unit configured to perform a first braking process which increases a braking force to the vehicle by operating a first braking device of the plurality of braking devices when the parking braking operation is performed while the vehicle is traveling, and a second braking control unit configured to perform a second braking process which increases the braking force to the vehicle by operating a second braking device, which is different from the first braking device, of the plurality of braking devices when there is a need to increase the braking force to the vehicle during the first braking process being performed.

When the parking braking operation is performed by a driver of the vehicle while the vehicle is traveling, the first braking device is operated by the first braking process, so that the braking force to the vehicle is increased. In this case, for example, when an abnormality has occurred in the first braking device, the braking force to the vehicle may not be sufficiently increased, in response to the driver's request.

According to the above configuration, when there is a need to increase the braking force to the vehicle during the first braking process, the second braking device different from the first braking device is operated by the second braking process, so that the braking force to the vehicle is increased. For this reason, even in the case where the braking force to the vehicle cannot be sufficiently increased by the first braking process due to the abnormality and the like in the first braking device, as described above, the second braking process is performed, so that the braking force to the vehicle can be increased by operating the second braking device. Therefore, when the parking braking operation is performed while the vehicle is traveling, it is possible to appropriately increase the braking force to the vehicle, in response to the driver's request.

BRIEF DESCRIPTION OF DRAWINGS

FIG. 4 is a flowchart depicting a process routine that is to be executed by the vehicle braking control device.

FIG. 5 is a map depicting a relation between a correction coefficient and a vehicle body speed of a vehicle, which are used to calculate a target braking force, in the vehicle braking control device.

DESCRIPTION OF EMBODIMENTS

Hereinafter, an exemplary embodiment of the vehicle braking control device will be described with reference to FIGS. 1 to 6.

Figure 1:
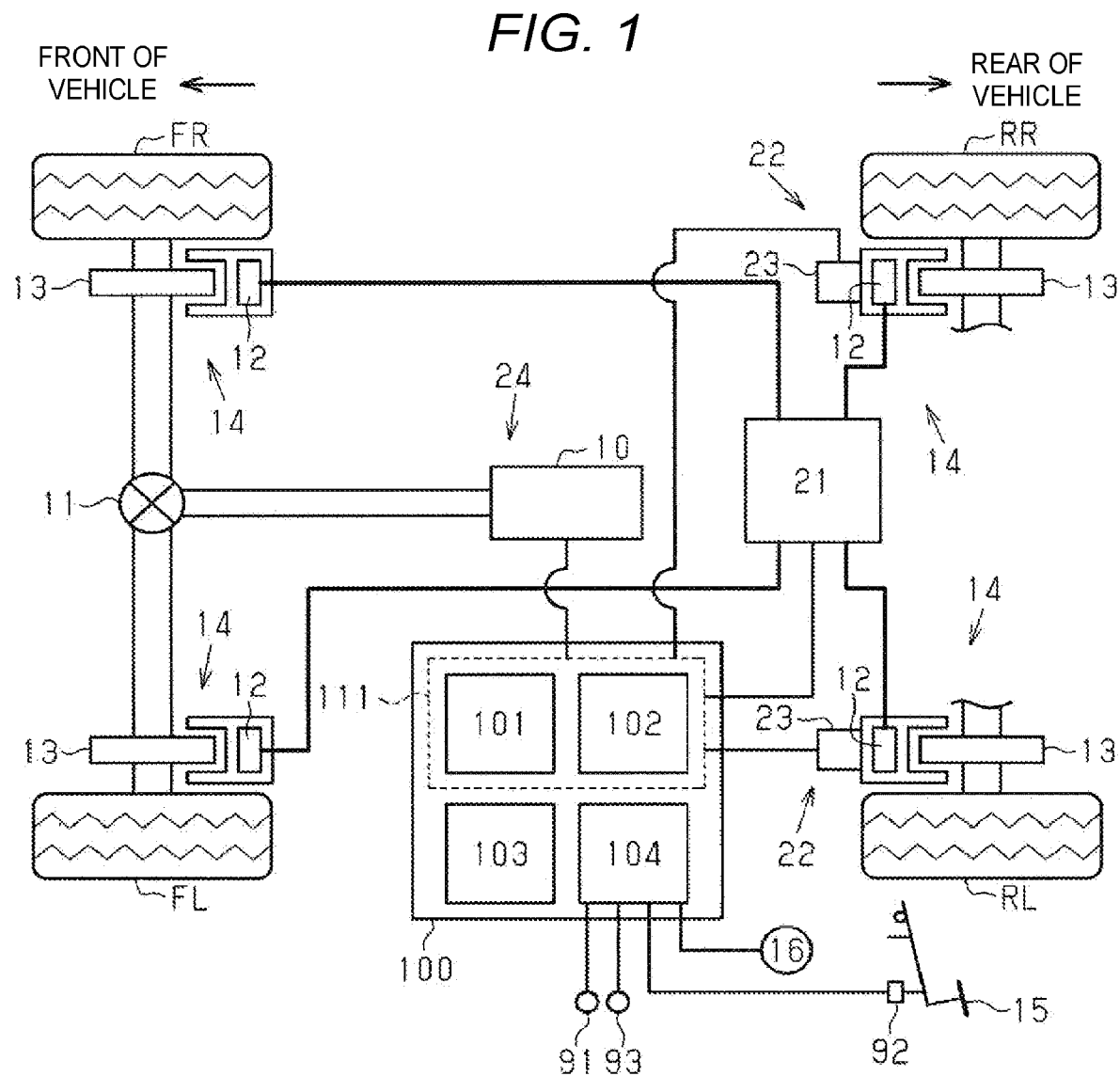
FIG. 1 is a configuration view depicting an outline of a vehicle equipped with a vehicle braking control device of an exemplary embodiment.

FIG. 1 depicts a vehicle equipped with a braking control device 100 of the exemplary embodiment. As shown in FIG. 1, the vehicle includes a drive motor 10, which is a drive source of the vehicle, and a plurality of (i.e., the same number as wheels) braking mechanisms 14 provided individually for each of wheels FL, FR, RL, RR. Each braking mechanism 14 has a wheel cylinder 12 to which a brake fluid is to be supplied. In the braking mechanism 14, when a WC pressure, which is a fluid pressure in the wheel cylinder 12, increases, a friction member is pressed to a disc rotor 13 configured to rotate integrally with each of the wheels FL, FR, RL, RR. Thereby, a friction braking force is applied to the wheels FL, FR, RL, RR.

A drive method of the vehicle shown in FIG. 1 is a front wheel drive method in which a drive force output from the drive motor 10 is transmitted to the front wheels FL, FR via a differential gear 11. Also, a regenerative braking force can be applied to the front wheels FL, FR by controlling the drive motor 10 and an inverter for the drive motor 10. That is, in the exemplary embodiment, an example of "a regenerative braking device 24" is configured by the drive motor 10, the inverter and the differential gear 11.

Also, the vehicle is provided with a hydraulic braking device 21 configured to control the friction braking force to each of the wheels FL, FR, RL, RR by adjusting the WC pressure in each of the wheel cylinders 12. The hydraulic braking device 21 can individually adjust the WC pressure in each of the wheel cylinders 12. In the meantime, when a braking operation member 15 such as a brake pedal is operated, the hydraulic braking device 21 can adjust the braking force to the vehicle, i.e., a sum of the braking forces to the respective wheels FL, FR, RL, RR, in cooperation with the regenerative braking device 24.

Also, the vehicle is provided with an electric-powered parking braking device 22 that is operated so as to increase the friction braking force to the rear wheels RL, RR when a parking braking switch 16 is switched from off to on. That is, a vehicle operation of switching the parking braking switch 16 from off to on corresponds to "a parking braking operation".

The parking braking device 22 includes a pressing member arranged in the wheel cylinder 12 corresponding to each of the rear wheels RL, RR and a parking motor 23 configured to displace the pressing member. When the parking motor 23 is driven to displace the pressing member toward the disc rotor 13, the friction member is pressed by the pressing member via a piston of the wheel cylinder 12, so that the friction member is brought close to the disc rotor 13. Thereby, the friction member is pressed to the disc rotor 13, so that the friction braking force can be applied to the rear wheels RL, RR.

As shown in FIG. 1, the braking control device 100 is electrically connected to a variety of sensors such as the parking braking switch 16, a stroke sensor 92 configured to detect an operating amount BPA of the braking operation member 15, and a vehicle speed sensor 91 configured to detect a vehicle body speed SPD of the vehicle. Also, the braking control device 100 is electrically connected to a front detection unit 93 capable of detecting an obstacle ahead of the vehicle, such as a preceding vehicle. As the front detection unit 93, for example, a millimeter wave radar device may be exemplified.

The braking control device 100 has, as functional units, a braking control unit 111, a calculation unit 103 and an acquisition unit 104. In the exemplary embodiment, each functional unit is mounted on one arithmetic device. However, the functional units mounted on a plurality of arithmetic devices may be respectively connected.

The acquisition unit 104 is configured to acquire information about a situation of the vehicle and a vehicle operation by the driver of the vehicle, based on signals input from the diverse sensors.

The calculation unit 103 is configured to calculate a target braking force GDRVT, which is a target value of the braking force to the vehicle, based on the information acquired by the acquisition unit 104.

The braking control unit 111 is configured to control the respective braking devices 21, 22, 24, based on the target braking force GDRVT calculated by the calculation unit 103. Also, the braking control unit 111 includes a first braking control unit 101 and a second braking control unit 102.

The first braking control unit 101 is configured to perform a first braking process that increases the braking force to the vehicle by operating the hydraulic braking device 21 of the respective braking devices 21, 22, 24 when the parking braking switch 16 is switched from off to on while the vehicle is traveling, i.e., when the parking braking operation is performed while the vehicle is traveling. In the first braking process, the hydraulic braking device 21 is operated so that the friction braking force to each of the wheels FL, FR, RL, RR is to increase. That is, in the exemplary embodiment, the hydraulic braking device 21 functions as an example of "a first braking device".

Meanwhile, in the first braking process, the parking braking device 22 may also be operated, in addition to the hydraulic braking device 21. However, when the hydraulic braking device 21 and the parking braking device 22 are operated by the first braking process, an amount of increase in the braking force to the vehicle by the operation of the hydraulic braking device 21 is larger than an amount of increase in the braking force to the vehicle by the operation of the parking braking device 22. That is, it can be said that, when operating both the hydraulic braking device 21 and the parking braking device 22 by the first braking process, the braking device that is mainly operated in the first braking process is the hydraulic braking device 21, which is the first braking device.

The second braking control unit 102 is configured to perform a second braking process that increases the braking force to the vehicle by operating the regenerative braking device 24, which is different from the hydraulic braking device 21, of the respective braking devices 21, 22, 24 when there is a need to increase the braking force to the vehicle during the first braking process being performed by the first braking control unit 101. That is, in the exemplary embodiment, the regenerative braking device 24 functions as an example of "a second braking device".

Subsequently, a braking process, which is performed by the braking control device 100 when the braking operation member 15 is operated or when the parking braking operation is performed, is described. The braking control device 100 performs an emergency braking process when the parking braking switch 16 is switched from off to on while the vehicle is traveling. On the other hand, the braking control device 100 performs a usual braking process when the emergency braking process is not performed.

First, a process routine that is executed by the braking control device 100 so as to perform the usual braking process is described. The process routine that is herein described is executed when the braking operation member 15 is being operated. This process routine is executed whenever a predetermined time elapses from a point of time at which the execution of the process routine is finally ended.

When the process routine is executed, the operating amount BPA is calculated by the acquisition unit 104, based on the signal input from the stroke sensor 92. Subsequently, the target braking force GDRVT is calculated by the calculation unit 103 so that a calculated value is to be larger as the operating amount BPA increases. For example, the calculation unit 103 may calculate the target braking force GDRVT by multiplying the operating amount BPA by a conversion coefficient for converting the operating amount into the braking force. Then, a target regenerative braking force GREGT, which is a target value of the regenerative braking force to the vehicle, is made to be the same as the target braking force GDRVT by the braking control unit 111, and the regenerative braking device 24 is operated on the basis of the target regenerative braking force GREGT.

Thereby, the regenerative braking force is applied to each of the front wheels FL, FR. Then, an actual regenerative braking force GREG, which is a regenerative braking force to be applied to the vehicle by operating the regenerative braking device 24, is subtracted from the target braking force GDRVT to deduce a friction target braking force GFRIT, which is a target value of the friction braking force to the vehicle, by the braking control unit 111, and the hydraulic braking device 21 is operated on the basis of the friction target braking force GFRIT. Thereby, the friction braking force to each of the wheels FL, FR, RL, RR is increased. Thereafter, the process routine is once ended.

In the meantime, when the acquisition unit 104 detects that the parking braking switch 16 is switched from off to on, a target parking braking force GEPBT is calculated by the calculation unit 103. When it can be determined that the vehicle is stopped, the parking braking device 22 is operated by the braking control unit 111, based on the target parking braking force GEPBT. Thereby, the friction braking force to the rear wheels RL, RR is increased. On the other hand, a case where it cannot be determined that the vehicle is stopped will be described later.

Subsequently, a process routine that is executed by the braking control device 100 so as to perform the emergency braking process is described with reference to FIG. 2. This process routine is executed whenever a predetermined time elapses from a point of time at which the execution of the process routine is finally ended.

Figure 2:
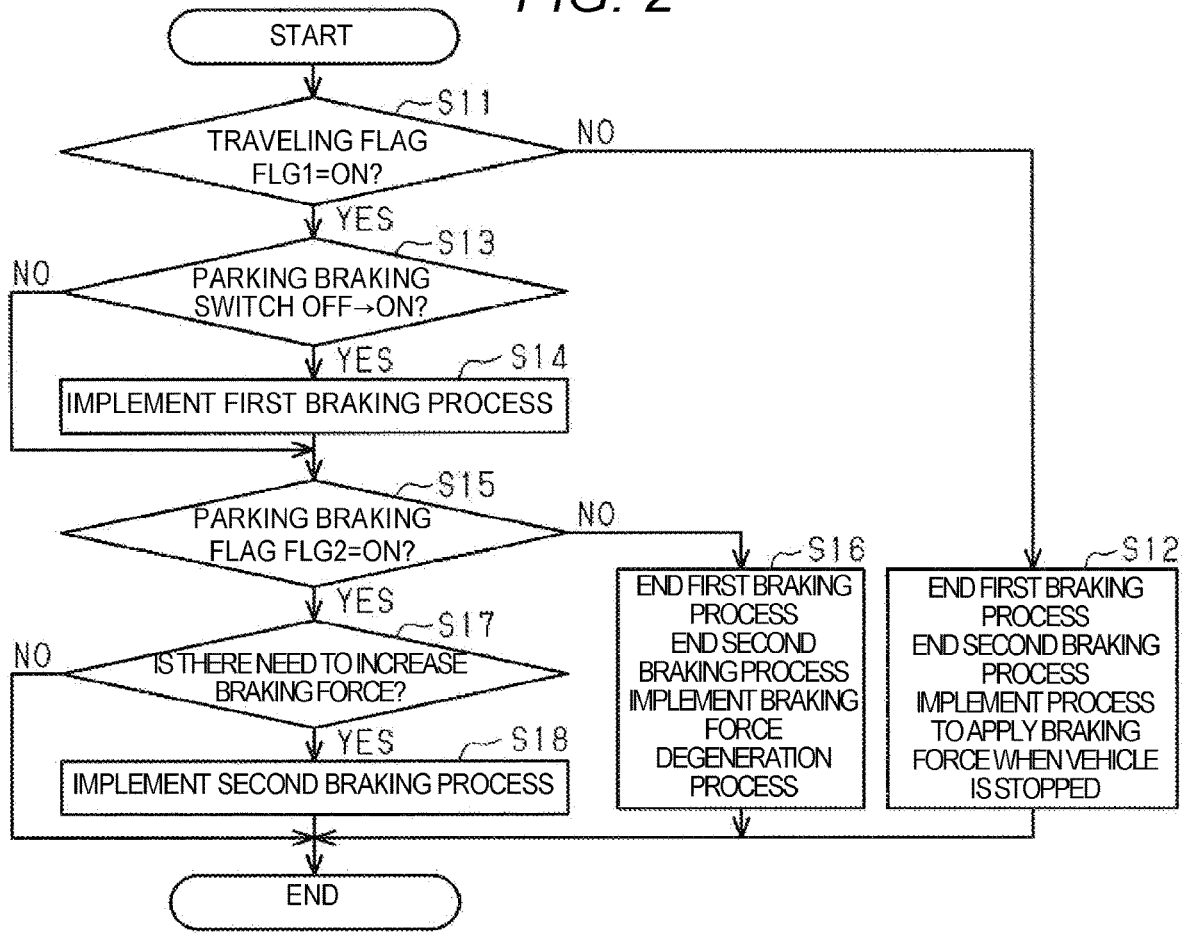
FIG. 2 is a flowchart depicting a process routine that is to be executed by the vehicle braking control device.

As shown in FIG. 2, when the process routine is executed, it is determined in step S11 whether a traveling flag FLG1 is on. The traveling flag FLG1 is a flag that is on when it is not determined that the vehicle is stopped and is off when it is determined that the vehicle is stopped. For example, when the vehicle body speed SPD detected by the vehicle speed sensor 91 is greater than a prescribed speed SPD0, the traveling flag FLG1 is on because it cannot be determined that the vehicle is stopped. On the other hand, when the vehicle body speed SPD is equal to or smaller than the prescribed speed SPD0, the traveling flag FLG1 is off because it can be determined that the vehicle is stopped. In the meantime, the prescribed speed SPD0 may be "0" or a value slightly greater than "0".

When the traveling flag FLG1 is off (step S11: NO), the process proceeds to step S12. When the traveling flag FLG1 is off in a state in which the first braking process is being performed, the operation of the first braking process is ended by the first braking control unit 101, in step S12. Also, when the traveling flag FLG1 is off in a state in which the second braking process is being performed, the operation of the second braking process is ended by the second braking control unit 102, in step S12.

When the first braking process and the second braking process are ended in this way, a process to apply braking force when the vehicle is stopped, in which a braking force capable of keeping the state in which the vehicle is stopped is applied to the vehicle, is performed by the braking control unit 111, in step S12. In the process to apply braking force when the vehicle is stopped, when the braking operation member 15 is being operated, the hydraulic braking device 21 is operated by the braking control unit 111, based on the target braking force GDRVT calculated by the calculation unit 103.

Thereby, the WC pressure in the wheel cylinder 12 for each of the wheels FL, FR, RL, RR is increased, so that the friction braking force to each of the wheels FL, FR, RL, RR is increased. Also, in the process to apply braking force when the vehicle is stopped, when the parking braking switch 16 is on, the parking braking device 22 is operated by the braking control unit 111. Thereby, a friction braking force corresponding to a drive amount of the parking motor 23 is applied to the rear wheels RL, RR.

On the other hand, when the traveling flag FLG1 is on (step S11: YES), the process proceeds to step S13. In step S13, an operating state of the parking braking switch 16 is determined. The operating state of the parking braking switch is detected by the acquisition unit 104. When it is determined that the parking braking switch 16 is switched from off to on (step S13: YES), the process proceeds to step S14. In step S14, the first braking process is performed by the first braking control unit 101.

In the meantime, the calculation of the target parking braking force GEPBT by the calculation unit 103 is performed in the same manner as the case in which it is determined that the vehicle is stopped, even though the parking braking switch 16 is switched from off to on in a situation where it is determined that the vehicle is traveling. The target parking braking force GEPBT calculated when the vehicle is traveling may be the same as a target parking braking force GEPBT calculated when the vehicle is stopped or may be a value different from the target parking braking force GEPBT calculated when the vehicle is stopped. In the first braking process, the first braking control unit 101 operates the hydraulic braking device 21 so that the WC pressure in each of the wheel cylinders 12 is to increase, based on the target parking braking force GEPBT.

When the first braking process is performed in this way, the process proceeds to step S15. On the other hand, when it is not determined in step S13 that the parking braking switch 16 is switched from off to on (step S13: NO), the process proceeds to step S15.

In step S15, it is determined whether a parking braking flag FLG2 is on. As described in detail later, the parking braking flag FLG2 is a flag that is on when the parking braking switch 16 is on. When the parking braking flag FLG2 is not on (step S15: NO), the process proceeds to step S16.

When the parking braking flag FLG2 is off in the state in which the first braking process is being performed, the operation of the first braking process is ended by the first braking control unit 101, in step S16. When the first braking process is ended in this way, a braking force degeneration process which gradually decreases the braking force to the vehicle up to a target braking force GDRVT corresponding to the current operating amount BPA of the braking operation member 15 is performed by the braking control unit 111, in step S16. In this case, the target braking force GDRVT is the same as a product obtained by multiplying the operating amount BPA by the conversion coefficient because the process has returned to the usual braking process.

Also, when the operating amount BPA of the braking operation member 15 becomes "0" in the state in which the second braking process is being performed, the operation of the second braking process is ended by the second braking control unit 102, in step S16. When the first braking process and the second braking process are ended, the braking force degeneration process which gradually decreases the braking force to the vehicle up to "0" is performed by the braking control unit 111, in step S16. For example, when the friction braking force is applied to the vehicle by operating the hydraulic braking device 21, the operation of the hydraulic braking device 21 is controlled by the braking control unit 111 so that the WC pressure in each of the wheel cylinders 12 is to gradually decrease, in the braking force degeneration process.

Also, when the regenerative braking force is applied to the vehicle by operating the regenerative braking device 24, the operation of the regenerative braking device 24 is controlled by the braking control unit 111 so that the regenerative braking force to the vehicle is to gradually decrease, in the braking force degeneration process. When a sum of the friction braking force, which is applied to the vehicle by operating the hydraulic braking device 21, and the regenerative braking force, which is applied to the vehicle by operating the regenerative braking device 24, becomes the same as the target braking force GDRVT, the operation of the braking force degeneration process is ended. Thereafter, the process routine is once ended.

On the other hand, the parking braking flag FLG2 is on (step S15: YES), the process proceeds to step S17. In step S17, it is determined whether there is a need to increase the braking force to the vehicle. Specifically, when an increase in the operating amount BPA of the braking operation member 15 is detected by the acquisition unit 104 in a situation where the hydraulic braking device 21 is operated due to the operation of the first braking process, it can be determined that there is a need to increase the braking force to the vehicle.

Figure 3:
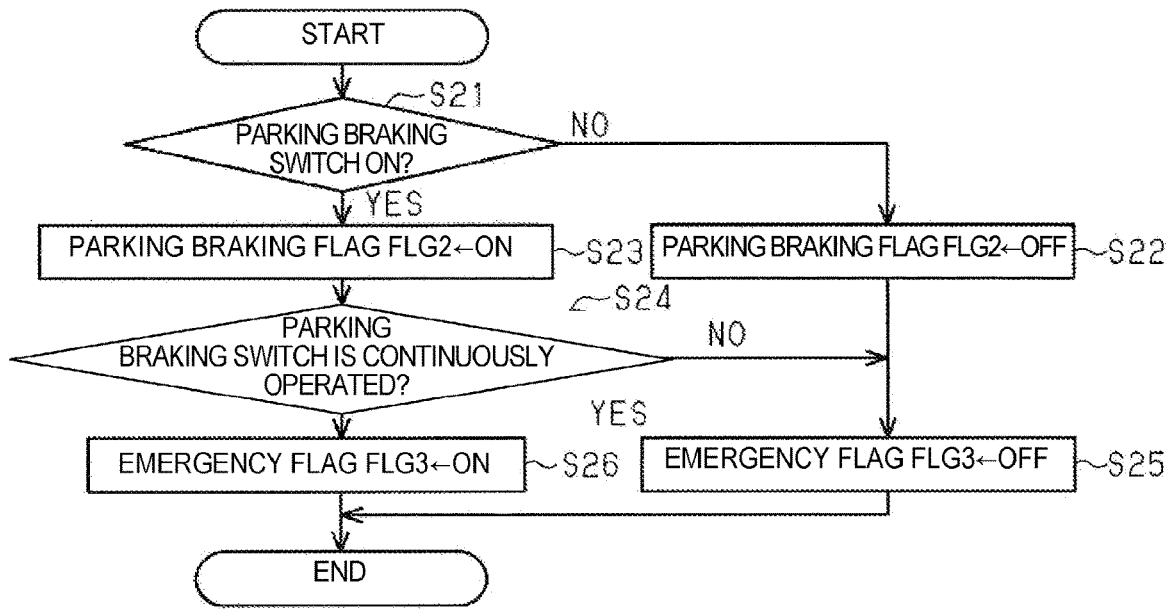
FIG. 3 is a flowchart depicting a process routine that is to be executed by the vehicle braking control device.

Alternatively, when an emergency flag FLG3, which will be described later with reference to FIG. 3, is switched from off to on, it can be determined that there is a need to increase the braking force to the vehicle. In the meantime, the emergency flag FLG3 is a flag that becomes on when a vehicle operation for turning on the parking braking switch 16 is again performed in the situation where the hydraulic braking device 21 is operated due to the operation of the first braking process.

When it is determined that there is a need to increase the braking force to the vehicle (step S17: YES), the process proceeds to step S18. In step S18, the second braking process is performed by the second braking control unit 102. That is, when the second braking process is performed as a result of the increase in the operating amount BPA of the braking operation member 15, the second braking control unit 102 operates the regenerative braking device 24 so that a total sum of the braking forces to the vehicle is to reach a sum of the target braking force GDRVT and the target parking braking force GEPBT associated with the operating amount BPA.

Although described in detail later, the target braking force GDRVT used herein is greater than the target braking force GDRVT when the usual braking process is performed. The operation of the regenerative braking device 24 is controlled using the target braking force GDRVT, so that the actual regenerative braking force GREG to the vehicle increases as the operating amount BPA increases.

When the second braking process is performed as a result of the switching of the emergency flag FLG3 from off to on, the second braking control unit 102 operates the regenerative braking device 24 so that the actual regenerative braking force GREG to the vehicle is to be greater than before the second braking process is performed. For example, the second braking control unit 102 operates the regenerative braking device 24 so that an amount of increase in the actual regenerative braking force GREG due to the operation of the second braking process is to be the same as the target parking braking force GEPBT.

In the meantime, although described in detail later, in the second braking process, the regenerative braking force to the vehicle is increased, and the friction braking force to the vehicle may also be increased by operating the hydraulic braking device 21.

When the operation of the second braking process is over, the process routine is once ended.

On the other hand, when it is determined that there is no need to increase the braking force to the vehicle (step S17: NO), the process routine is once ended.

Subsequently, a process routine that is executed by the acquisition unit 104 so as to determine an operating state of the parking braking switch 16 is described with reference to FIG. 3. This process routine is repeatedly executed every predetermined time.

As shown in FIG. 3, when execution of the process routine is started, it is determined in step S21 whether the parking braking switch 16 is on. When it is determined that the parking braking switch 16 is not on (step S21: NO), the process proceeds to step S22. In step S22, the parking braking flag FLG2 becomes off. Then, the process proceeds to step S25. In step S25, the emergency flag FLG3 becomes off. Thereafter, the process routine is once ended.

On the other hand, when it is determined that the parking braking switch 16 is on (step S21: YES), the process proceeds to step S23. In step S23, the parking braking flag FLG2 becomes on. Then, the process proceeds to step S24. In step S24, it is determined whether the parking braking switch 16 is continuously operated.

Here, "continuous operation" indicates that the vehicle operation for turning on the parking braking switch 16 is again performed in a situation in which the parking braking switch 16 is already on. When it is determined that the parking braking switch 16 is not continuously operated (step S24: NO), the process proceeds to step S25.

On the other hand, when it is determined that the parking braking switch 16 is continuously operated (step S24: YES), the process proceeds to step S26. In step S26, the emergency flag FLG3 becomes on. Then, the process routine is once ended. In the meantime, the emergency flag FLG3, which has been on in step S26, becomes off when it is determined that the vehicle is stopped, for example.

Subsequently, a process routine that is executed by the calculation unit 103 when the second braking process of step S18 is being performed is described with reference to FIGS. 4 and 5. This process routine is repeatedly executed every predetermined time.

As shown in FIG. 4, when execution of the process routine is started, a temporary target braking force GDRVT' is calculated on the basis of the operating amount BPA, in step S31. The calculation unit 103 calculates the temporary target braking force GDRVT' that is greater as the operating amount BPA is larger. For example, the calculation unit 103 calculates, as the temporary target braking force GDRVT', a product obtained by multiplying the conversion coefficient by the operating amount BPA. That is, the temporary target braking force GDRVT' is the same as the target braking force GDRVT that is calculated when the usual braking process is performed.

Also, the calculation unit 103 calculates, as the target braking force GDRVT, a product obtained by multiplying a correction coefficient K1 set greater than "1" by the temporary target braking force GDRVT'. Therefore, in the exemplary embodiment, the calculation unit 103 can calculate the target braking force GDRVT corresponding to the predetermined operating amount BPA so that it is to be greater when the second braking process is being performed, as compared to a case in which the second braking process is not performed. When the target braking force GDRVT is calculated in this way, the process proceeds to step S32.

In step S32, the target parking braking force GEPBT, which is a control target value in the first braking process, is acquired. Then, the process proceeds to step S33. Then, in step S33, the target regenerative braking force GREGT is calculated. Here, the target regenerative braking force GREGT is the same as the target braking force GDRVT calculated in step S31. In the second braking process, the second braking control unit 102 operates the regenerative braking device 24, based on the target regenerative braking force GREGT set in this way. When the target regenerative braking force GREGT is calculated, the process proceeds to step S34.

Subsequently, in step S34, the actual regenerative braking force GREG, which is applied to the vehicle by operating the regenerative braking device 24, is calculated on the basis of the information acquired by the acquisition unit 104. Then, the process proceeds to step S35. In step S35, the friction target braking force GFRIT is calculated. That is, the friction target braking force GFRIT is calculated by subtracting the actual regenerative braking force GREG from a sum of the target braking force GDRVT calculated in step S21 and the target parking braking force GEPBT acquired in step S32.

When the friction target braking force GFRIT calculated in this way is greater than the target parking braking force GEPBT, the hydraulic braking device 21 is operated so that the friction braking force to the vehicle is to be larger by a difference obtained by subtracting the target parking braking force GEPBT from the friction target braking force GFRIT, in the second braking process. On the other hand, when the friction target braking force GFRIT is the same as the target parking braking force GEPBT, the friction braking force to the vehicle is not increased by the operation of the hydraulic braking device 21, in the second braking process. Then, the process routine is once ended.

Meanwhile, in the exemplary embodiment, the correction coefficient K1 is deduced using a map shown in FIG. 5. That is, FIG. 5 depicts a relation between the vehicle body speed SPD of the vehicle and the correction coefficient K1. As shown in FIG. 5, the correction coefficient K1 becomes gradually larger as the vehicle body speed SPD increases. However, the correction coefficient K1 is deduced to be greater than "1" even when the vehicle body speed SPD is "0".

In the exemplary embodiment, the map shown in FIG. 5 is used, so that the correction coefficient K1 is set to a value corresponding to the vehicle body speed SPD upon start of the operation of the second braking process. For this reason, the calculation unit 103 can calculate the target braking force GDRVT corresponding to the predetermined operating amount BPA so that it is to be larger as the vehicle body speed SPD increases, during the second braking process being performed.

In the below, operations and effects of the braking control device 100 in accordance with the exemplary embodiment are described.

Figure 6A:
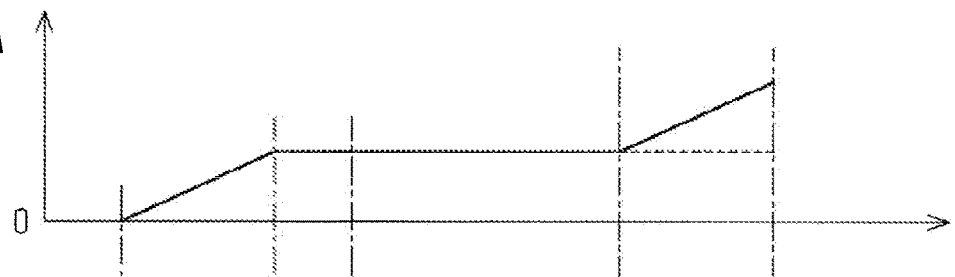
FIG. 6 is a timing chart when the vehicle braking control device performs a braking process.
Figure 6B:
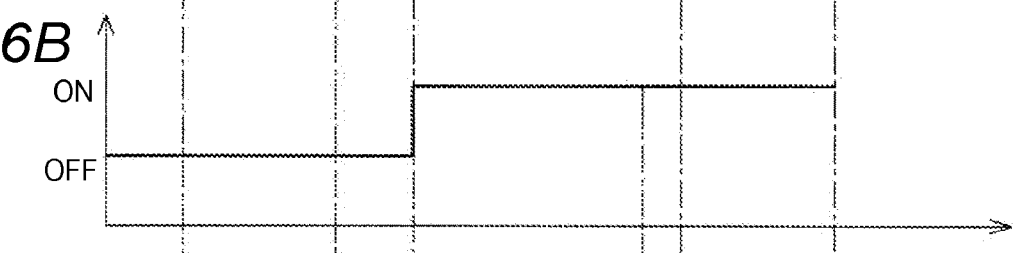
Figure 6C:
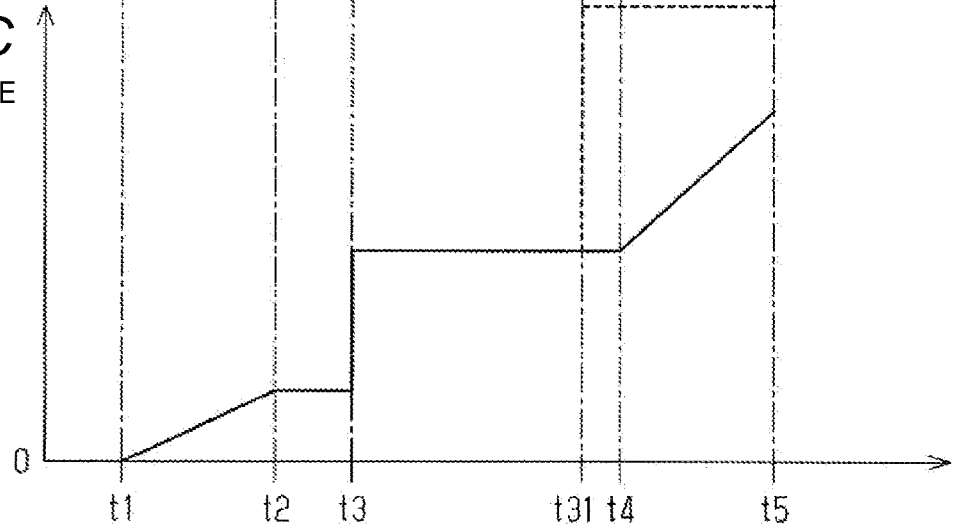

FIG. 6 depicts an example in which the parking braking switch 16 is operated while the vehicle is traveling, so that the emergency braking process is performed. In FIG. 6(c), a total sum of the respective braking forces, which are applied to the vehicle by operating the respective braking devices 21, 22, 24, is shown.

As shown in FIG. 6(a), the operation of the braking operation member 15 is started at timing t1 while the vehicle is traveling. At timing t1, the parking braking switch 16 is off, so that the parking braking flag FLG2 is off. For this reason, the first braking process and the second braking process as the emergency braking process are not performed. Therefore, the usual braking process is performed from timing t1. In this case, the target braking force GDRVT is the same as the temporary target braking force GDRVT'. Then, the regenerative braking device 24 and the hydraulic braking device 21 are operated on the basis of the target braking force GDRVT, so that the braking force to the vehicle is increased after timing tl, as shown in FIG. 6(c).

After timing t2, the operating amount BPA is kept constant. For this reason, the operations of the regenerative braking device 24 and the hydraulic braking device 21 are controlled so that the braking force to the vehicle is also to be kept constant.

At timing t3, when the vehicle operation is performed so that the parking braking switch 16 is switched from off to on, as shown in FIG. 6(b), the first braking process is performed. Thereby, the friction braking force to each of the wheels FL, FR, RL, RR is increased by operating the hydraulic braking device 21, and the braking force to the vehicle is increased, as shown in FIG. 6(c). In the meantime, since the parking braking switch 16 is on at timing t3, the parking braking flag FLG2 is on.

If only the braking force to one-side wheels of the front wheels FL, FR and the rear wheels RL, RR is increased while the vehicle is traveling, a distribution balance of the braking force between the front wheels FL, FR and the rear wheels RL, RR is deteriorated, so that a behavior of the vehicle may be unstable or a turning performance of the vehicle may be lowered. In this respect, in the first braking process, the hydraulic braking device 21 is operated as the first braking device, so that it is possible to increase the braking force to both wheels of the front wheels FL, FR and the rear wheels RL, RR. Thereby, the distribution balance of the braking force between the front wheels FL, FR and the rear wheels RL, RR is suppressed from being deteriorated, so that it is possible to suppress the behavior of the vehicle from being unstable or the turning performance of the vehicle from being lowered.

In the example of FIG. 6, the operating amount BPA of the braking operation member 15 is increased after timing t4 at which the braking force to the vehicle is increased by the operation of the first braking process. That is, after timing t4, it can be determined that there is a need to increase the braking force to the vehicle. For this reason, after timing t4, the second braking process is performed. In this case, since the target braking force GDRVT is increased in correspondence to the increase in the operating amount BPA, the regenerative braking force to the vehicle is increased by operating the regenerative braking device 24.

Even when the hydraulic braking device 21 is operated by the first braking process, if an abnormality occurs in the hydraulic braking device 21, for example, the braking force to the vehicle may not be sufficiently increased, in response to the driver's request. In this respect, in the second braking process, the braking force to the vehicle is increased by operating the regenerative braking device 24, which is a braking device different from the hydraulic braking device 21 to be operated by the first braking process. Thereby, even when it is not possible to sufficiently increase the braking force to the vehicle by the first braking process, it is possible to increase the braking force to the vehicle by performing the second braking process. Therefore, when the parking braking operation is performed while the vehicle is traveling, it is possible to appropriately increase the braking force to the vehicle, in response to the driver's request.

When the driver increases the operating amount BPA of the braking operation member 15 because it is not possible to sufficiently increase the braking force to the vehicle even though the hydraulic braking device 21 is operated by the first braking process, the driver may request an emergency braking, like a case where it is intended to avoid a collision between the vehicle and an obstacle ahead of the vehicle, for example. In the case in which the driver requests such emergency braking, it is preferable that the higher the vehicle body speed SPD of the vehicle is, the greater a deceleration of the vehicle is.

Here, in the example of FIG. 6, a length of the time period from timing t1 to timing t2 and a length of the time period from timing t4 to timing t5 are the same. Also, the amounts of increase in the operating amount BPA during both the time periods are the same. However, the target braking force GDRVT during the time period from timing t1 to timing t2, in which the second braking process is not performed, is a value corresponding to the operating amount BPA, and the target braking force GDRVT during the time period from timing t4 to timing t5, in which the second braking process is performed, is a value corresponding to the product obtained by multiplying the operating amount BPA by the correction coefficient K1 (>1). For this reason, the amount of increase in the target braking force GDRVT during the time period from timing t4 to timing t5 is greater than the amount of increase in the target braking force GDRVT during the time period from timing t1 to timing t2. Thereby, during the time period from timing t4 to timing t5, it is possible to increase the braking force to the vehicle earlier than the time period from timing t1 to timing t2. Therefore, it is possible to early increase the deceleration of the vehicle.

Also, the correction coefficient K1 is set to be greater as the vehicle body speed SPD increases. For this reason, while the second braking process is being performed, the higher the vehicle body speed SPD is upon start of the second braking process, the greater the target braking force GDRVT is. That is, when the vehicle body speed SPD is higher upon start of the second braking process, it is possible to increase an increase rate of the braking force to the vehicle. Therefore, for example, in the situation in which there is an obstacle in front of the vehicle, it is possible to increase a probability of avoiding a collision between the vehicle and the obstacle.

In the meantime, as shown with the broken line in FIG. 6(a), even in a case in which the operating amount BPA is kept constant even after timing t4, when the parking braking switch 16 is continuously operated at timing t31, as shown with the dash-dot line in FIG. 6(b), it can be determined at timing t31 that there is a need to increase the braking force. In this case, since the second braking process is performed, it is possible to increase the braking force to the vehicle by operating at least the regenerative braking device 24 of the respective braking devices 21, 22, 24, as shown with the broken line in FIG. 6(c).

In the meantime, the exemplary embodiment may be appropriately modified and performed, as follows.

The vehicle equipped with the braking device capable of applying the regenerative braking force to the front wheels FL, FR, as an example of the regenerative braking device 24, has been exemplified. However, the braking control device 100 can be applied to a vehicle equipped with a braking device capable of applying the regenerative braking force to the rear wheels RL, RR, too. Also, the braking control device 100 can be applied to a vehicle equipped with a braking device capable of applying the regenerative braking force to the four wheels, too.

In the exemplary embodiment, the greater target braking force GDRVT is calculated as the vehicle body speed SPD based on the detection signal from the vehicle speed sensor 91 increases. However, the parameter that is used to calculate the target braking force GDRVT is not limited to the vehicle body speed SPD. For example, a relative speed RSPD of the vehicle based on an obstacle ahead of the vehicle may be detected by the front detection unit 93, and the greater target braking force GDRVT may be calculated as the relative speed RSPD increases. The target braking force GDRVT is calculated using the relative speed RSPD, so that it is possible to more easily avoid the collision between the vehicle and the obstacle ahead of the vehicle.

When the vehicle body speed SPD is between "0" and a predetermined speed, the correction coefficient K1 may be set to a predetermined value, and when the vehicle body speed SPD exceeds the predetermined speed, the correction coefficient K1 may be calculated so that it is to be gradually greater than the predetermined value as the vehicle body speed SPD increases. As the predetermined value, "1" or a value greater than "1" may be adopted.

The correction coefficient K1 may be kept as a preset fixed value.

The target braking force GDRVT while the second braking process is being performed may be the same as the target braking force GDRVT when the second braking process is not performed.

In the second braking process of the exemplary embodiment, when the actual regenerative braking force GREG is smaller than the target regenerative braking force GREGT, the hydraulic braking device 21 is operated so as to increase the friction braking force to the vehicle, based on the difference between the actual regenerative braking force GREG and the target regenerative braking force GREGT. However, in the second braking process, when the actual regenerative braking force GREG is smaller than the target regenerative braking force GREGT, the parking braking device 22 may be operated, based on the difference between the actual regenerative braking force GREG and the target regenerative braking force GREGT.

In the second braking process of the exemplary embodiment, the regenerative braking device 24 is operated as the second braking device. However, in the second braking process, the parking braking device 22 may be operated to increase the friction braking force to the rear wheels RL, RR after the regenerative braking device 24 is operated as the second braking device to increase the regenerative braking force to the front wheels FL, FR. For example, when a slip amount (=vehicle body speed− wheel speed) of the front wheels FL, FR becomes a prescribed amount or larger due to the increase in the regenerative braking force to the front wheels FL, FR, the friction braking force to the rear wheels RL, RR may be increased by operating the parking braking device 22. Thereby, during the operation of the second braking process, it is possible to suppress the distribution balance of the braking force between the front wheels FL, FR and the rear wheels RL, RR from being deteriorated.

In the second braking process of the exemplary embodiment, the regenerative braking device 24 is operated as the second braking device. However, the parking braking device 22 may be operated as the second braking device. That is, a difference obtained by subtracting the target parking braking force GEPBT from the target braking force GDRVT may be complemented by the friction braking force that is applied in association with the operation of the parking braking device 22.

In the first braking process of the exemplary embodiment, the hydraulic braking device 21 is operated as the first braking device. When the braking device to be operated as the first braking device in the first braking process is different from the braking device to be operated as the second braking device in the second braking process, the regenerative braking device 24 may be operated as the first braking device, for example. Also, the parking braking device 22 may be operated as the first braking device.

The parking braking device 22 may be configured to apply the braking force to the front wheels FL, FR. Also, the parking braking device 22 may be configured to apply the braking force to both the front wheels FL, FR and the rear wheels RL, RR.

As the vehicle, there is a vehicle that is not equipped with the regenerative braking device capable of applying the regenerative braking force to the wheels in cooperation with the hydraulic braking device 21. The braking control device 100 can be applied to even the vehicle, inasmuch as the vehicle has the electric-powered parking braking device 22.

The invention claimed is:

1. A vehicle braking control device applicable to a vehicle equipped with a plurality of braking devices including an electric-powered parking braking device that increases a braking force to a wheel of the vehicle when a parking braking operation is performed, the vehicle braking control device comprising:
  a first braking control unit configured to perform a first braking process which increases a braking force to the vehicle by operating a first braking device of the plurality of braking devices when the parking braking operation is performed while the vehicle is traveling; and
  a second braking control unit configured to perform a second braking process which increases the braking force to the vehicle by operating a second braking device, which is different from the first braking device, of the plurality of braking devices when there is a need to increase the braking force to the vehicle during the first braking process being performed, wherein
  the plurality of braking devices includes a regenerative braking device configured to apply a regenerative braking force to at least one wheel of a front wheel and a rear wheel, and a hydraulic braking device configured to adjust a fluid pressure in a wheel cylinder corresponding to the front wheel and a fluid pressure in a wheel cylinder corresponding to the rear wheel,
  in the first braking process, the first braking control unit is configured to operate the hydraulic braking device as the first braking device, thereby increasing the braking force to the vehicle by increasing the fluid pressure in the wheel cylinder corresponding to the front wheel and the fluid pressure in the wheel cylinder corresponding to the rear wheel, and
  in the second braking process, the second braking control unit is configured to operate at least one of the parking braking device and the regenerative braking device, as the second braking device, thereby increasing the braking force to the vehicle.

2. The vehicle braking control device according to claim 1, wherein in the second braking process, the second braking control unit is configured to operate the regenerative braking device as the second braking device, thereby increasing the braking force to the vehicle.

3. The vehicle braking control device according to claim 1, wherein
  the parking braking device is configured to apply a friction braking force to one of the front wheel and the rear wheel and not to apply the friction braking force to the other wheel of the front wheel and the rear wheel,
  the regenerative braking device is configured to apply a regenerative braking force to the other wheel and not to apply the regenerative braking force to the one wheel, and
  in the second braking process, the second braking control unit is configured to increase the regenerative braking force to the other wheel by operating the regenerative braking device and then to increase the friction braking force to the one wheel by operating the parking braking device.

4. A vehicle braking control device applicable to a vehicle equipped with a plurality of braking devices including an electric-powered parking braking device that increases a braking force to a wheel of the vehicle when a parking braking operation is performed, the vehicle braking control device comprising:
  a first braking control unit configured to perform a first braking process which increases a braking force to the vehicle by operating a first braking device of the plurality of braking devices when the parking braking operation is performed while the vehicle is traveling;
  a second braking control unit configured to perform a second braking process which increases the braking force to the vehicle by operating a second braking device, which is different from the first braking device, of the plurality of braking devices when there is a need to increase the braking force to the vehicle during the first braking process being performed; and
  a calculation unit configured to calculate a target braking force, which is a target value of the braking force to the vehicle, in such a manner that a calculated value is to be greater as an operating amount of a braking operation member increases, wherein
  the second braking control unit determines that there is a need to increase the braking force to the vehicle when the operating amount of the braking operation member is increased during the first braking process being performed by the first braking control unit, and performs the second braking process on the basis of the target braking force calculated by the calculation unit,
  the calculation unit calculates the target braking force corresponding to a predetermined operating amount so that it is to be greater when the second braking process is being performed by the second braking control unit, as compared to a case in which the second braking process is not performed,
  the plurality of braking devices includes a regenerative braking device configured to apply a regenerative braking force to at least one wheel of a front wheel and a rear wheel, and a hydraulic braking device configured to adjust a fluid pressure in a wheel cylinder corresponding to the front wheel and a fluid pressure in a wheel cylinder corresponding to the rear wheel,
  in the first braking process, the first braking control unit is configured to operate the hydraulic braking device as the first braking device, thereby increasing the braking force to the vehicle by increasing the fluid pressure in the wheel cylinder corresponding to the front wheel and the fluid pressure in the wheel cylinder corresponding to the rear wheel, and
  in the second braking process, the second braking control unit is configured to operate at least one of the parking braking device and the regenerative braking device, as the second braking device, thereby increasing the braking force to the vehicle.

5. The vehicle braking control device according to claim 4, wherein in the second braking process, the second braking control unit is configured to operate the regenerative braking device as the second braking device, thereby increasing the braking force to the vehicle.

6. The vehicle braking control device according to claim 4, wherein
  the parking braking device is configured to apply a friction braking force to one of the front wheel and the rear wheel and not to apply the friction braking force to the other wheel of the front wheel and the rear wheel, the regenerative braking device is configured to apply a regenerative braking force to the other wheel and not to apply the regenerative braking force to the one wheel, and in the second braking process, the second braking control unit is configured to increase the regenerative braking force to the other wheel by operating the regenerative braking device and then to increase the friction braking force to the one wheel by operating the parking braking device.

* * * * *